(12) United States Patent
Chen

(10) Patent No.: US 7,368,716 B2
(45) Date of Patent: May 6, 2008

(54) INFRARED IMAGING SYSTEM AND LENS MODULE FOR USE WITH THE SAME

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/556,411

(22) Filed: Nov. 3, 2006

(65) Prior Publication Data

US 2008/0042063 A1 Feb. 21, 2008

(30) Foreign Application Priority Data

Aug. 16, 2006 (CN) .................. 2006 1 0062140

(51) Int. Cl.
*G01J 5/02* (2006.01)
*G01T 1/24* (2006.01)
*G01J 1/00* (2006.01)

(52) U.S. Cl. .................. 250/339.01; 250/370.06; 250/503.1

(58) Field of Classification Search .......... 250/339.01, 250/332, 252.1, 339.11, 341.8, 345, 370.06, 250/503.1

See application file for complete search history.

(56) References Cited

U.S. PATENT DOCUMENTS

| 5,038,038 | A | * | 8/1991 | Weniger et al. | ........ 250/339.11 |
| 6,476,391 | B1 | | 11/2002 | Zhang | |
| 2004/0073120 | A1 | * | 4/2004 | Motz et al. | ................. 600/478 |

* cited by examiner

*Primary Examiner*—David Porta
*Assistant Examiner*—Faye Boosalis
(74) *Attorney, Agent, or Firm*—Jeffrey T. Knapp

(57) ABSTRACT

An IR imaging system includes a lens module and an imaging module coupled to the lens module. The lens module includes a barrel defining a through hole, at least one lens received in the through hole and an IR bandpass filter received in the barrel and configured for filtering out visible light. The imaging module includes a housing and an IR image sensor received in the housing. The IR imaging system can prevent IR image sensors being affected by visible light.

12 Claims, 3 Drawing Sheets

INFRARED IMAGING SYSTEM AND LENS MODULE FOR USE WITH THE SAME

BACKGROUND OF THE INVENTION

1. Field of the Invention

The present invention relates to imaging systems and, more particularly, to an infrared (IR) imaging system that can prevent an IR image sensor therein from being affected by visible light.

2. Description of Related Art

The wavelength of IR light is longer than that of visible light. IR light shares many of the properties of visible light, but its different wavelength has several unique characteristics. For instance, materials that are opaque to visible light may be transparent to IR, and vice-versa. IR light is much less subject to scattering and absorption by smoke or dust than visible light, and IR light cannot be seen by the human eye.

Also, unlike visible light, which is given off by ordinary objects only at very high temperatures, IR energy is emitted by all objects at ordinary temperatures higher than 0° K. This means that IR energy is all around us all the time, even in the dark. Different objects give off varying amounts of IR energy, depending on the temperature of the object and their emissivity. Passive IR cameras are designed to sense differing amounts of IR energy coming from the various areas of a scene using an IR image sensor to convert them to corresponding intensities of visible light by electronics for display purposes. This permits true see-in-the-dark capability as well as the ability to observe thermal properties in all light conditions. The IR image sensor can also react to some visible light which will reduces a signal-to-noise ratio of imaging system.

What is needed, therefore, is an IR imaging system which can prevent IR image sensor from being affected by visible light.

SUMMARY OF THE INVENTION

In accordance with one embodiment, an IR imaging system includes a lens module and an imaging module coupled to the lens module. The lens module includes a barrel defining a through hole, at least one lens received in the through hole and an IR bandpass filter received in the barrel and configured (i.e., structured and arranged) for filtering out visible light. The imaging module includes a housing and an IR image sensor received in the housing.

In accordance with one embodiment, a lens module includes a barrel defining a through hole, at least one lens received in the through hole and an IR bandpass filter received in the barrel and configured for filtering out visible light.

In accordance with one embodiment, an IR imaging system includes a lens module and an imaging module coupled to the lens module. The lens module includes a barrel defining a through hole and at least one lens received in the through hole. The imaging module includes a housing, an IR image sensor received in the housing and an IR bandpass filter received in the housing and disposed between the lens module and the IR image sensor.

Other advantages and novel features will become more apparent from the following detailed description of present IR imaging system, when taken in conjunction with the accompanying drawings.

BRIEF DESCRIPTION OF THE DRAWINGS

Many aspects of the present IR imaging system can be better understood with reference to the following drawings. The components in the drawings are not necessarily drawn to scale, the emphasis instead being placed upon clearly illustrating the principles of the present IR imaging system. Moreover, in the drawings, like reference numerals designate corresponding parts throughout the several views.

DETAILED DESCRIPTION OF THE INVENTION

Embodiments of the present IR imaging system will now be described in detail below and with reference to the drawings.

Figure 1:
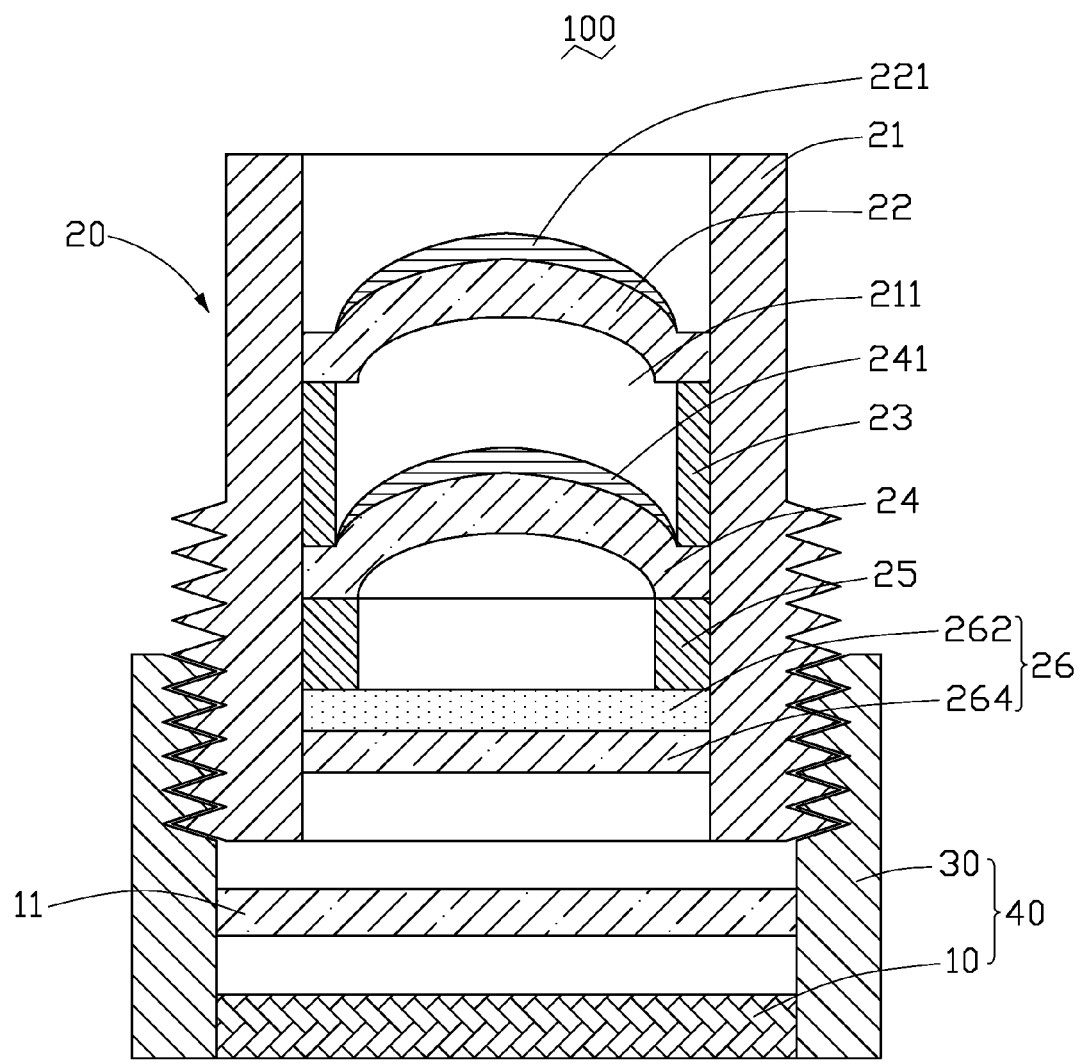
FIG. 1 is a schematic, cross-section view of an IR imaging system according to a first embodiment of the present invention.

Referring to FIG. 1, an IR imaging system 100 according to a first embodiment includes a lens module 20 and an imaging module 40 coupled to the lens module 20. The imaging module 40 includes a housing 30 and an IR image sensor 10 received in the housing 30.

The IR image sensor is configured for connecting to a circuit board and can convert IR signals to image signals. The IR image sensor 10 can be a CCD or a CMOS. Preferably, the IR image sensor 10 is packaged in a ceramic leaded chip carrier (CLCC), plastic laded chip carrier (PLCC) or chip scale package (CSP). A glass cover 11 is disposed on the top of IR image sensor 10 in order to avoid contamination.

The lens module 20 is coupled to the imaging module 40. In order that a distance between the lens module 20 and the IR image sensor 10 received in the housing 30 can be changed to allow focusing, the lens module 20 should preferably be locked with the housing 30 by a cam structure or a thread structure. In present embodiment, the lens module 20 is threadedly engaged with the housing 30.

The lens module 20 includes a barrel 21 defining a through hole 211, at least one lens and an IR bandpass filter 26. The lens and the IR bandpass filter 26 are received in the through hole 211. The barrel 21 can be made of a material selected from the group consisting of polycarbonate, acrylonitrile-butadiene-styrene, and any combinations thereof.

In present embodiment, the lens module 20 has two lenses, i.e., a first lens 22 and a second lens 24. The first lens 22, a first spacer 23, the second lens 24, a second spacer 25 and the IR bandpass filter 26 are received in the through hole 211 one on top of the other in that order from an object side of the lens module 20 to an image side. The first lens 22 and the second lens 24 each can be a plastic lens or a glass lens. The first lens 22 has an anti-reflection coating 221 on a surface facing towards the object side thereof. The second lens 24 has an anti-reflection coating 241 on a surface facing towards the object side thereof. The anti-reflection coating 221 and 241 can improve the IR light transmittance of the first lens 22 and the second lens 24. The first spacer 23 is disposed between the first lens 22 and the second lens 24. The second spacer 25 is disposed between the second lens 24 and the IR bandpass filter 26.

The IR bandpass filter 26 can filter out visible light. In present embodiment, the IR bandpass filter 26 is light-permeable in a bandwidth from 800 nm to 1100 nm. The IR bandpass filter 26 has a transmittance approximately less than 2% for IR light with a wavelength in the approximate range of 1100 nm to 1200 nm. The IR bandpass filter 26 has a transmittance of approximately less than 2% for visible light with a wavelength in the approximate range from 400 nm to 800 nm.

Figure 2:
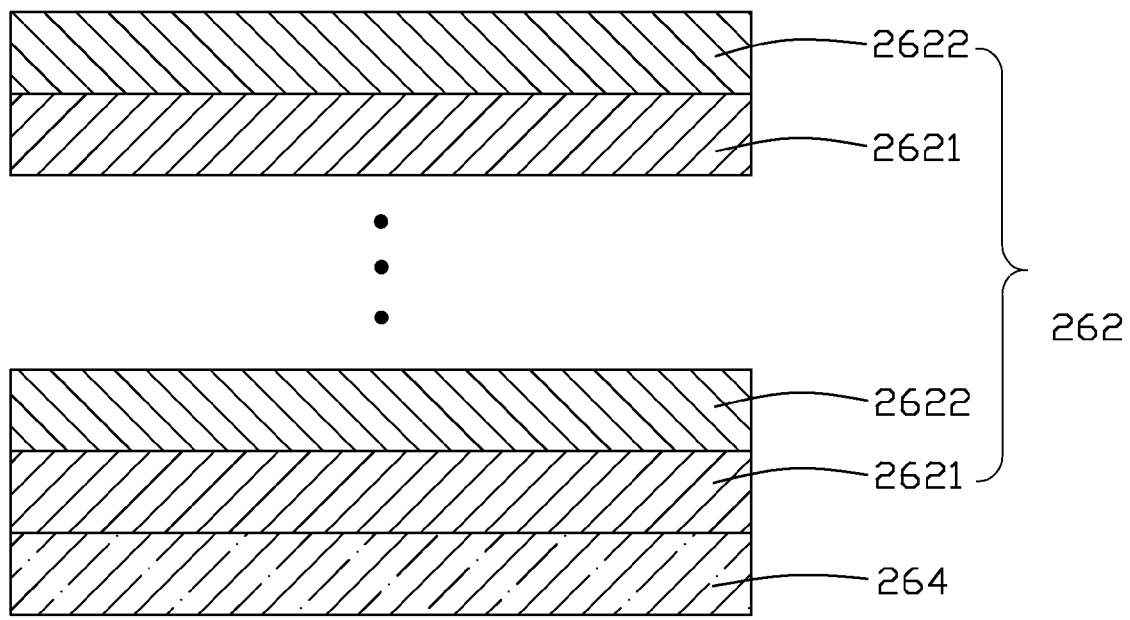
FIG. 2 is a schematic, cross-section view of an IR bandpass filter of FIG. 1.

Referring to FIG. 2, the IR bandpass filter 26 includes a transparent substrate 264 and a filter film 262 formed thereon. The filter film 262 can be formed on either the surface of the transparent substrate 264 facing towards the object side or the surface of the transparent substrate 264 facing towards the image side. In present embodiment, the transparent substrate 264 is a glass substrate with the filter film 262 formed on the surface facing towards the object side. Preferably the IR bandpass filter 26 should have a transmittance of IR light with an approximate wavelength of 800 nm to 1100 nm in a range from approximately 92% to 98%. The filter film 262 is a multi-layer oxide thin film stack. The number of layers of the thin film stack is in a range from about 30 to about 50. In present embodiment, the thin film stack has a plurality of first layers 2621 and second layers 2622 formed in alternating fashion. The material of the first layer 2621 can be selected from $Ti_3O_5$, $TiO_3$, $TiO_2$, $Ta_2O_5$, and any mixtures thereof. The material of the second layer 2622 can be selected from $SiO_2$, $Al_2O_3$, AlN, and any mixtures thereof.

Figure 3:
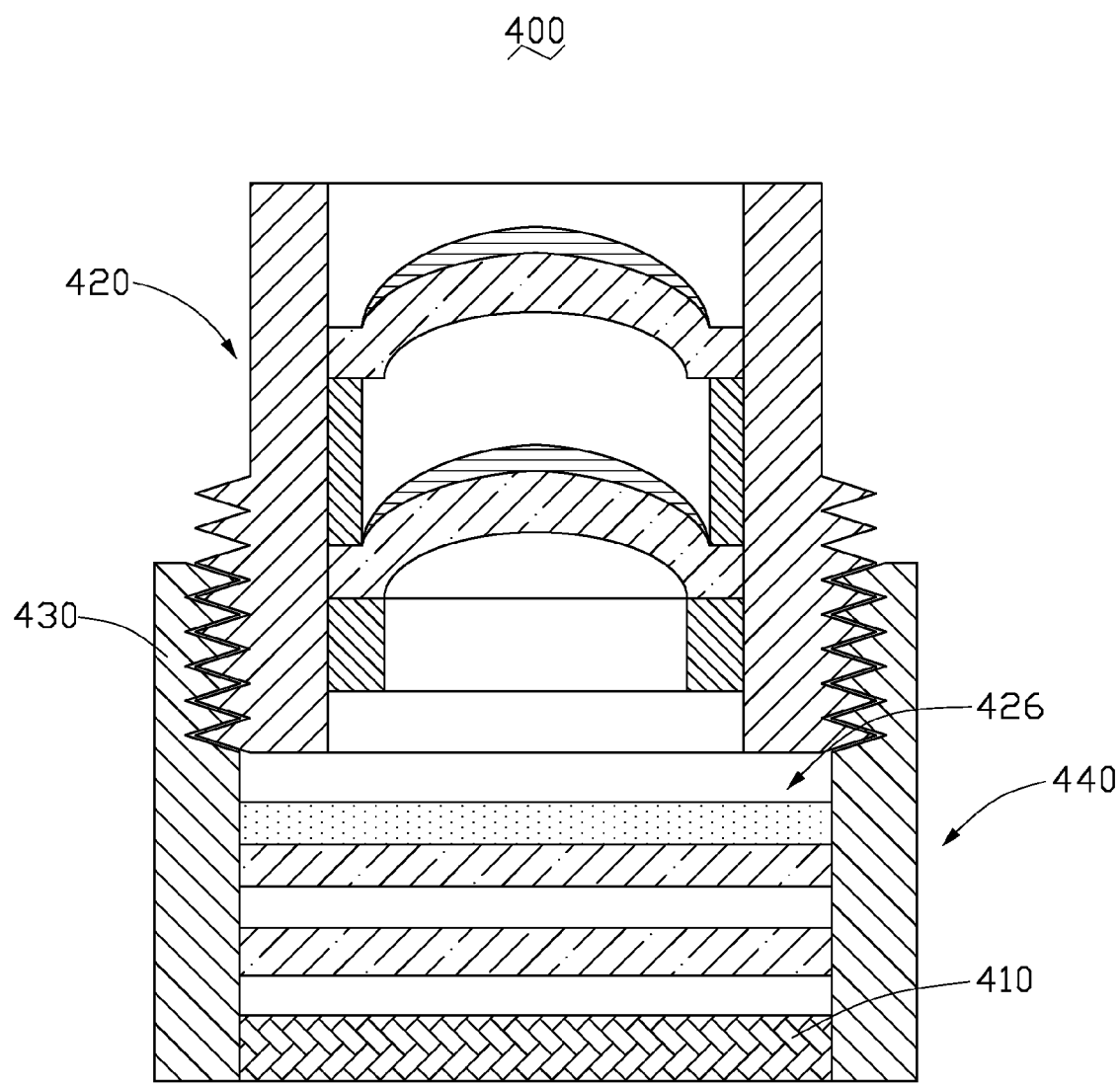
FIG. 3 is a schematic, cross-section view of an IR imaging system according to a second embodiment of the present invention.

Referring to FIG. 3, an IR imaging system 400 according to a second embodiment includes a lens module 420 and an imaging module 440 coupled to the lens module 420. The imaging module 440 includes a housing 430 and an IR image sensor 410 received in the housing 430. The imaging system 400 is similar to the IR imaging system 100 except that an IR bandpass filter 426 is not received in the lens module 420 but received in housing 430 and disposed between the lens module 420 and the IR image sensor 410.

As stated above, the IR imaging system has an IR bandpass filter disposed at the object side of the IR image sensor, allowing it to filter out visible light which would otherwise affect the IR image sensor and reduce a signal-to-noise ratio of the IR imaging system.

It is understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. An IR imaging system, comprising:
    a lens module comprising:
        a barrel defining a through hole;
        at least one lens received in the through hole; and
        an IR bandpass filter received in the barrel and configured for filtering out visible light; and
    an imaging module threadedly engaged with the lens module, the imaging module comprising:
        a housing; and
        an IR image sensor received in the housing.

2. The IR imaging system as claimed in claim 1, wherein the at least one lens has an anti-reflection coating formed thereon.

3. The IR imaging system as claimed in claim 1, wherein the IR bandpass filter is light-permeable in a bandwidth from about 800 nm to about 1100 nm.

4. The IR imaging system as claimed in claim 1, wherein the IR bandpass filter includes a transparent substrate and a filter film formed thereon.

5. The IR imaging system as claimed in claim 4, wherein the filter film is a multi-layer oxide thin film stack.

6. The IR imaging system as claimed in claim 1, wherein the number of layers of the thin film stack is in a range from about 30 to about 50.

7. An IR imaging system, comprising:
    a lens module comprising:
        a barrel defining a through hole, and
        at least one lens received in the through hole; and
    an aging module threadedly engaged with the lens module, the imaging module comprising:
        a housing;
        an IR image sensor received in the housing; and
        an IR bandpass filter configured for filtering out visible light, the IR bandpass filter being received in the housing and disposed between the lens module and the IR image sensor.

8. The IR imaging system as claimed in claim 7, wherein the at least one lens has an anti-reflection coating formed thereon.

9. The IR imaging system as claimed in claim 7, wherein the IR bandpass filter is light-permeable in a bandwidth from about 800 µm to about 1100 nm.

10. The IR imaging system as claimed in claim 7, wherein the IR bandpass filter includes a transparent substrate and a filter film formed thereon.

11. The IR imaging system as claimed in claim 10, wherein the filter film is a multi-layer oxide thin film stack.

12. The IR imaging system as claimed in claim 11, wherein the number of layers of the thin film stack is in a range from about 30 to about 50.

* * * * *